US007885619B2

(12) United States Patent
Cheng et al.

(10) Patent No.: US 7,885,619 B2
(45) Date of Patent: Feb. 8, 2011

(54) DIVERSITY TRANSMISSION USING A SINGLE POWER AMPLIFIER

(75) Inventors: Jung-Fu Cheng, Cary, NC (US); Leonid Krasny, Cary, NC (US); Rajaram Ramesh, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 782 days.

(21) Appl. No.: 11/808,769

(22) Filed: Jun. 12, 2007

(65) Prior Publication Data

US 2008/0311858 A1 Dec. 18, 2008

(51) Int. Cl.
*H04B 7/02* (2006.01)
*H01Q 11/12* (2006.01)

(52) U.S. Cl. ............ 455/101; 455/121; 455/123; 455/65; 375/299

(58) Field of Classification Search .......... 455/101.121, 455/123, 65, 69, 276.1, 289
See application file for complete search history.

(56) References Cited

U.S. PATENT DOCUMENTS

| | | | | |
|---|---|---|---|---|
| 5,280,472 A * | 1/1994 | Gilhousen et al. | ........... | 370/335 |
| 5,392,054 A | 2/1995 | Bottomley et al. | ........... | 343/702 |
| 6,415,140 B1 * | 7/2002 | Benjamin et al. | ........... | 455/275 |
| 2004/0157567 A1 * | 8/2004 | Jootar et al. | ................ | 455/101 |
| 2005/0084029 A1 * | 4/2005 | Lim | ........................... | 375/267 |
| 2006/0009168 A1 * | 1/2006 | Khan et al. | ................. | 455/101 |
| 2006/0035608 A1 * | 2/2006 | Zhang et al. | ................ | 455/129 |
| 2006/0172710 A1 * | 8/2006 | Cahana et al. | .............. | 455/101 |

FOREIGN PATENT DOCUMENTS

| | | |
|---|---|---|
| GB | 2 304 496 | 3/1997 |
| WO | WO 02/080375 | 10/2002 |
| WO | WO 2007/056892 | 5/2007 |

OTHER PUBLICATIONS

Olofsson et al., "Transmitter Diversity with Antenna Hopping for Wireless Communication Systems", 1997 IEEE, pp. 1743-1747.
Mecklai et al., "Transmit Antenna Diversity for Wireless Communications", 1995 IEEE, pp. 1500-1504.
Lo, "Maximum Ratio Transmission", IEEE Transactions on Communications, vol. 47, No. 10, Oct. 1999, pp. 1458-1461.
International Search Report and Written Opinion mailed Sep. 15, 2008 in corresponding PCT Application PCT/SE2008/050333.
U.S. Appl. No. 11/808,768, filed Jun. 12, 2007, Jung-Fu Chen et al.

* cited by examiner

*Primary Examiner*—Duc M Nguyen
(74) *Attorney, Agent, or Firm*—Nixon & Vanderhye P.C.

(57) ABSTRACT

Diversity radio transmission is accomplished with excellent performance using multiple antennas receiving a transmission signal from a single power amplifier. A data signal to be transmitted is provided to a first antenna, and a phase-shifted version of the data signal is applied a second antenna. The relative phase shift between the data signal transmitted over the two transmit antennas ensures the two antenna signals can be constructively combined at the receiver. In one non-limiting example embodiment, the relative phase shift is determined by processing pilot signals sent along with the data signal and which are transmitted with predetermined phase shifts.

19 Claims, 4 Drawing Sheets

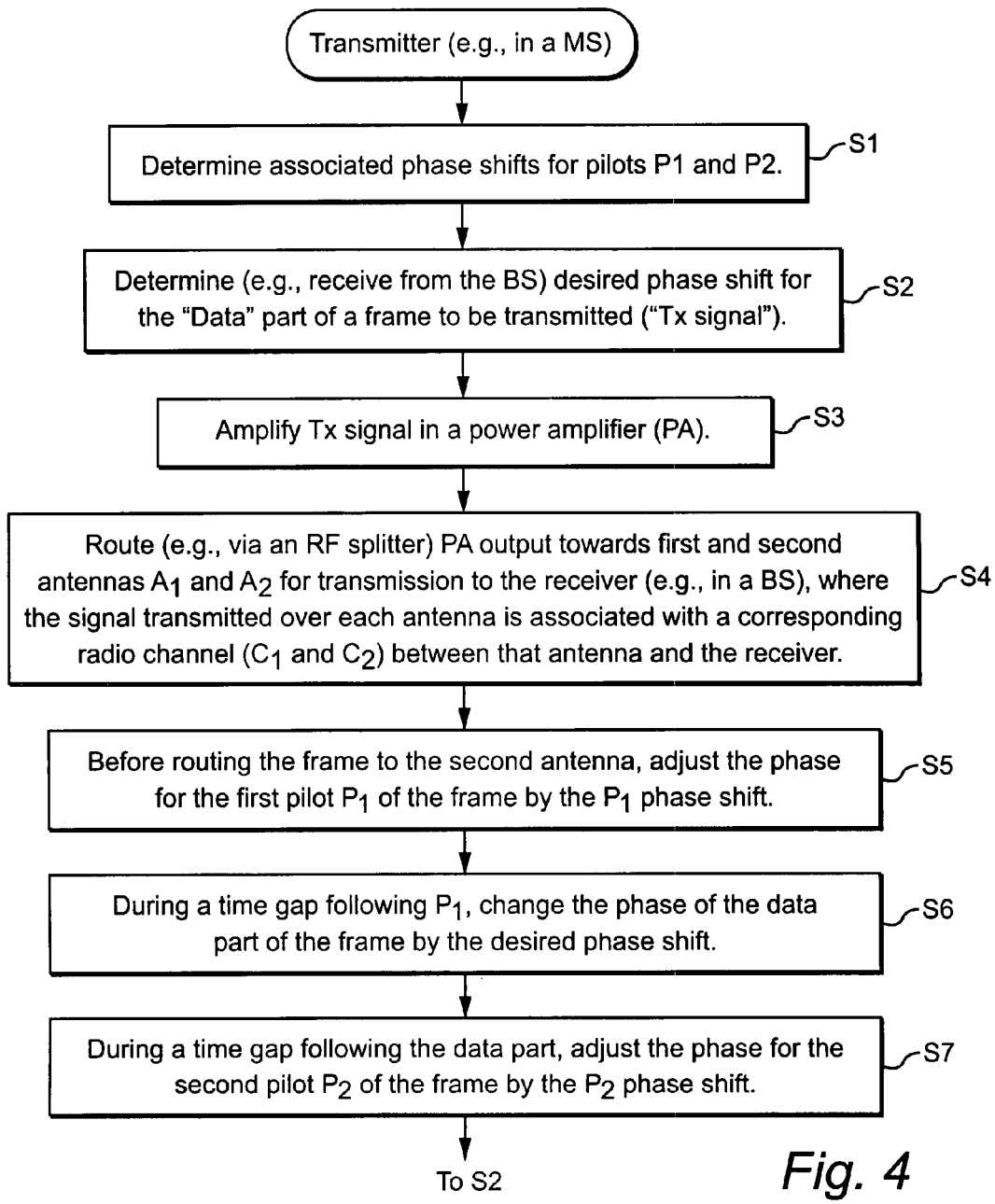

ns ("antenna hopping") on a fixed schedule. Such antenna hopping avoids the likelihood of bad fades in a statistical fashion, i.e., the probability of a bad fade affecting both (all) of the spatially-separated antennas is low. But lacking knowledge of the uplink transmission channel conditions, this kind of fixed schedule antenna hopping has limited promise. In other words, the selected antenna may not be the best antenna for the current channel conditions.

DIVERSITY TRANSMISSION USING A SINGLE POWER AMPLIFIER

RELATED APPLICATION

This application is related to U.S. patent application Ser. No. 11/808,768, entitled "Diversity Transmission Using A Single Power Amplifier," filed on Jun. 12, 2007, the content of which is incorporated here by reference.

TECHNICAL FIELD

The technical field relates to radio communications, and in particular, to improving performance using diversity transmission.

BACKGROUND

Rayleigh fading is a phenomenon associated with radio communications where multiple reflections of a transmitted signal constructively and destructively superpose at points in space according to the relative phase and amplitude of all the reflected signals. This spatial interaction of multi-path signals produces both strong peaks (local maximums) and deep nulls (local minimums) of relative signal strength with regard to varying position. Often the fading can result in signal "holes" where the signal strength will drop below a minimum threshold of reception of a radio receiver, e.g., a mobile radio station or terminal. Depending on the relative phase of the interacting signals, the peaks and nulls of signal strength are generally separated by a fraction of the free space wavelength of the carrier frequency of the transmitted signal. These signal strength fluctuations present a significant and challenging problem, particularly in the mobile radio communications environment.

One mechanism which addresses the problems of Rayleigh fading is a space diversity technique where two or more antennas are separated by a minimum of one half of a wavelength of carrier frequencies to be received. At radio frequencies, for example, a deep signal fade can be overcome by moving the antenna only a few inches. As a result of separating two antennas by an appropriate distance, each antenna receives a signal whose fading pattern is uncorrelated with the fading pattern of the signal received by the other antenna. Improved signal reception is then achieved simply by programming the receiver to select (using one or more conventional techniques) the antenna with the strongest signal. More sophisticated techniques combine the signals from both antennas. Commonly-assigned U.S. Pat. No. 5,392,054 to Bottomley describes an antenna assembly for diversity reception in a mobile radio terminal.

Transmit diversity antennas have also been considered to enhance performance including system capacity and data throughput. With transmit diversity, the required transmit signal power to provide a particular data rate or a particular signal quality can be reduced. Transmit diversity involves transmitting data on two or more antennas, where the geographical separation between the antennas leads to path loss characteristics that are independent from antenna to antenna. However, the signal transmitted from the multiple antennas can combine constructively or destructively over the air at a receiving station, and the receiving station cannot coherently combine signals from the transmit diversity antennas. To alleviate this problem, different signals representing the same data may be transmitted from the two transmit antennas.

One approach for diversity transmission for mobile terminals might be to switch between two or more transmit antennas ("antenna hopping") on a fixed schedule. Such antenna hopping avoids the likelihood of bad fades in a statistical fashion, i.e., the probability of a bad fade affecting both (all) of the spatially-separated antennas is low. But lacking knowledge of the uplink transmission channel conditions, this kind of fixed schedule antenna hopping has limited promise. In other words, the selected antenna may not be the best antenna for the current channel conditions.

In another approach referred to as delay diversity, the signal transmitted from a second antenna is delayed with respect to the signal transmitted from a first antenna. At the receiver, the resulting signal appears as if it passed through a channel with dispersion, and a well-designed equalizer may be used to achieve performance gain over transmission from a single antenna. Yet another approach uses space-time coding, where the signal is encoded across two transmit antennas in such a way as to provide diversity gain at a receiver.

Using two or more antennas to transmit from the mobile station on the uplink to the base station to improve performance introduces additional cost and power concerns. In general, each transmit antenna requires a power amplifier along with other transmit diversity branch circuitry. This is particularly true for the delay diversity and space-time coding approaches described above. Not only are power amplifiers costly electronic components, they also consume considerable battery power. The antenna hopping approach described above can use a single power amplifier, but its performance is limited. Hence, it would be desirable to provide a transmit diversity arrangement that does not increase the number of power amplifiers in a mobile station and that also provides significant performance benefits.

SUMMARY

A radio transmitter includes a first antenna, a second antenna, a power amplifier, and a power splitter. The power amplifier receives a transmit signal and provides an output signal via the power splitter to the first antenna and to the second antenna for diversity transmission of the output signal to a radio receiver. The radio transmitter may be included, for example, in a mobile radio terminal or a radio base station. The transmitter also includes a phase shifter for shifting a phase of the output signal by a first amount before transmission over the second antenna so that a relative phase shift exists between the output signal transmitted from the first antenna and the output signal transmitted from the second antenna. By transmitting the signal from both antennas with a relative phase difference selected to provide for constructive combining at the receiver, significantly improved performance is achieved.

A controller is configured to vary the first amount of phase shift applied by the phase shifter. For example, if there is symmetry between uplink and downlink channels, the controller can determine the first amount of phase shift based on a channel estimate of transmission diversity channels between the radio transmitter and radio receiver detected by the transmitter to provide constructive combining of the two signals at the radio receiver. Alternatively, for less symmetric situations, the controller may determine the first amount of phase shift from a feedback command sent by the receiver to the transmitter. The receiver estimates an optimal phase shift that needs to be applied at the transmitter and feeds this information back to be used at the transmitter.

In this latter receiver feedback example, the transmitted signal may be divided into multiple frames, each frame including a first pilot, a data portion, and a second pilot. The first amount of phase shift as described above is associated with the data portion. A second amount of phase shift is associated with one of the first and second pilots, and a third amount of phase shift is associated with the other pilot. There is a first time gap between the first pilot and the data portion, a second time gap between the data portion and the second pilot, and a third time gap at the end of the frame between the second pilot and the first pilot of the next frame. The phase of the output signal is changed during the first time gap, and the phase of the second pilot is set to its phase during the second time gap. The phase of the first pilot is set at the gap between frames.

One receiver feedback example detects the first and second pilots in the received diversity transmission and uses them to determine a first channel estimate associated with the first transmitter antenna and a second channel estimate associated with the second transmitter antenna. The first phase shift amount is calculated based on the first and second channel estimates to achieve constructive combining of the two antenna signals at the receiver, and it is sent to the radio transmitter. For example, a signal-to-noise ratio of the received diversity transmission of the output signal can be calculated for different first phase shifts, and the phase shift having a higher or highest one of the calculated signal-to-noise ratios can be sent to the transmitter. As another non-limiting example, the correlation matrix of the channels between all transmit and receive antennas is calculated. The maximal eigenvector of the channel correlation matrix is averaged over time and frequency. A phase shift corresponding to the phase of the maximal eigenvector for that correlation matrix is then sent to the transmitter.

The power splitter splits the output signal into a first magnitude provided to the first antenna and a second magnitude provided to the phase shifter. Those magnitudes can be the same or different. In one example embodiment, the receiver can also feed back information to the transmitter to vary the first and/or second magnitudes based on an amplitude/magnitude at the receiver between the two transmit diversity channels.

BRIEF DESCRIPTION OF THE DRAWINGS

FIG. 3 is a diagram illustrating a non-limiting, example data frame structure for use in transmitting data to the receiver;

FIG. 4 is a flowchart illustrating example, non-limiting procedures for diversity transmission using the example data frame structure in FIG. 3;

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The description is primarily given in the context of an uplink diversity data transmission from a mobile terminal to a radio base station to provide an example and non-limiting context for explanation. But the technology described may be used in any radio transmitter and radio receiver. For example, diversity transmission apparatus using a single power amplifier could be implemented in a radio base station. The term mobile station or terminal (sometimes called "user equipment") encompasses any type of device including phones, PDAs, lap tops, gaming devices, other computing or communications devices, etc. that have wireless communications capability.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
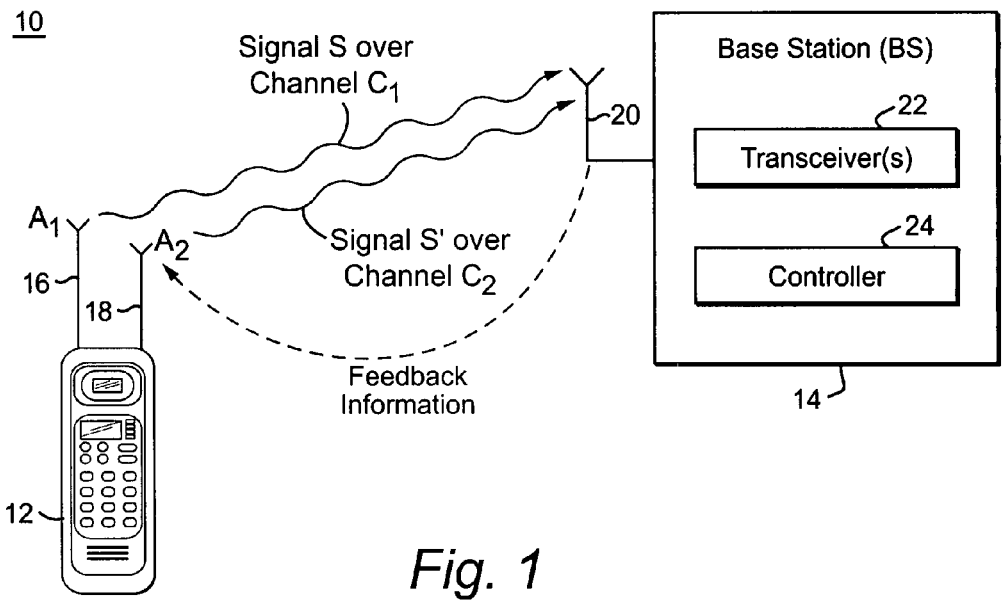
FIG. 1 illustrates high level diagram of a non-limiting, example radio communications system where transmit diversity is employed at a mobile transmitter transmitting uplink to a radio base station.

FIG. 1 illustrates a non-limiting example of a radio communication system 10 showing a diversity transmission from a mobile terminal 12 to a radio base station (BS) 14. The base station is typically part of a Radio Access Network (RAN) responsible for the establishment and control of radio connections with mobile terminals in it geographic coverage area. The mobile terminal 12 includes two diversity antennas $A_1$ and $A_2$ labeled as 16 and 18. The signal S is transmitted from the antenna $A_1$ and sent over a radio channel $C_1$ to the base station 14. The same signal shifted in phase S' is transmitted from the antenna $A_2$ and sent over a radio channel $C_2$ to the base station 14. The base station 14 includes one or more antennas 20 coupled to radio transceivers 22 for receiving the diversity transmission from the mobile terminal 12. A controller 24 controls the transceivers 22, and in a non-limiting example, base station feedback embodiment described further below, provides feedback information to the mobile terminal 12 based on a current estimate of the uplink radio channels $C_1$ and $C_2$. The base station processes the diversity signals received from the mobile terminal to improve the performance and robustness of the reception.

Figure 2:
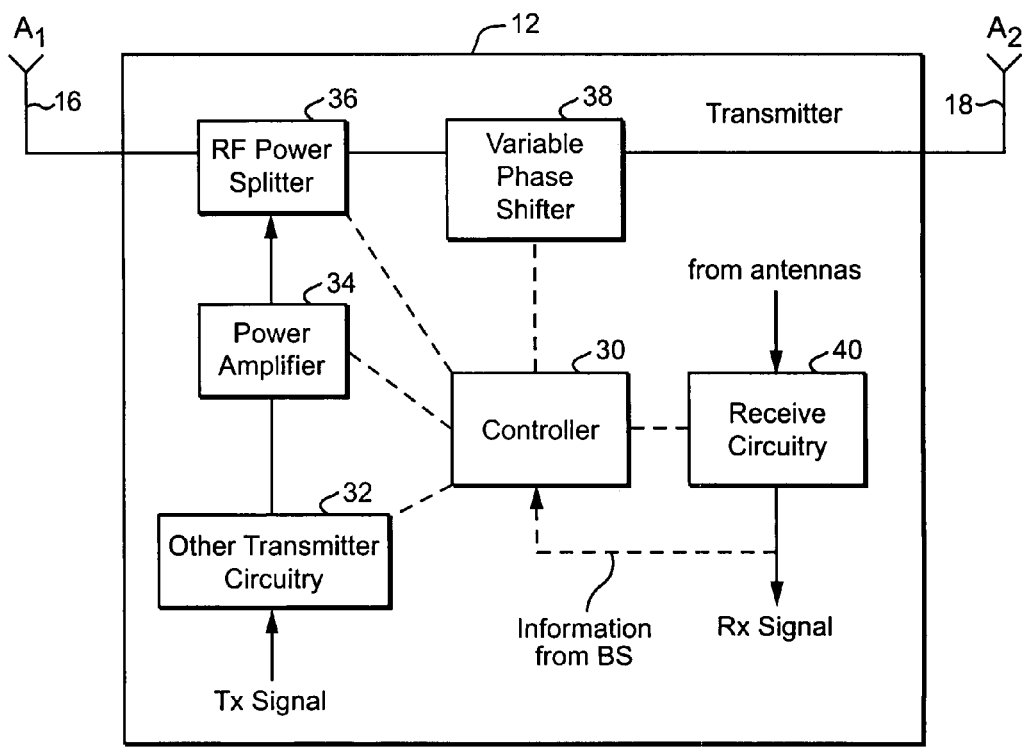
FIG. 2 is function block diagram of a non-limiting, example diversity transmitter using a single power amplifier.

FIG. 2 is a function block diagram of a non-limiting, example diversity transmitter 12 using a single power amplifier 34. Since the transmitter 12 in this example is the mobile terminal in FIG. 1, power to the various functional elements in FIG. 2 is supplied from a battery not shown. A transmission signal (Tx signal) is provided via other transmitter circuitry 32 (e.g., frequency converting, filtering, etc.) to the power amplifier 34, where the Tx signal is amplified for radio transmission. The signal output from the power amplifier 34 is provided to an RF power splitter 36. One output of the power splitter 36 goes directly to antenna $A_1$, and the second output of the power splitter 36 is passed through a variable phase shifter 38, which can shift the phase of the output signal by one of a plurality of values. The phase-shifted output signal is then provided to antenna $A_2$.

A controller 30, e.g., a microprocessor, controls the actual phase shift applied by the phase shifter 38. Representative control signals to and/or from the controller 30 and the various functional blocks are shown as dotted lines. In the base station feedback example embodiment described further below, the base station 14 provides phase shift information to the controller 30 via receive circuitry 40. Based on that phase shift information, the controller varies the phase shift applied by the variable phase shifter 38 to the splitter output signal applied to antenna $A_2$.

When signals transmitted from two antennas are received together, they can combine constructively or destructively, depending on their relative phase difference. By varying a relative phase shift between the signals transmitted by the two antennas $A_1$ and $A_2$, the signals from those antennas having traveled over their respective channels $C_1$ and $C_2$, combine constructively at the base station receiver. As explained earlier, using two signals from different antennas (rather than just one) means it is less likely that both antenna signals will be adversely affected by a fade. Constructive combining adds even more robustness to fading, noise, and interference.

The base station receiver is in a good position to determine the channel characteristics of uplink channels $C_1$ and $C_2$. Those channel characteristics may be used to determine a relative phase shift to ensure constructive signal combination in order to achieve desirable diversity benefits. Alternatively, if the downlink channels $C'_1$ and $C'_2$ (corresponding to the uplink channels $C_1$ and $C_2$) from the base station to the antennas $A_1$ and $A_2$ can be assumed to be reasonably symmetric, then the mobile terminal can estimate the channel characteristics of uplink channels $C_1$ and $C_2$, and from that information, determine a relative phase shift to ensure constructive signal combination. Further details are now provided for a non-limiting example embodiment where the base station provides phase shift feedback.

In order for the base station to determine a current condition of the uplink radio channels $C_1$ and $C_2$, one or more known signals called pilots are transmitted along with the data. Because the base station knows what the pilot information should be, it compares the known pilot to the pilot information actually received and estimates a current channel transfer function or other channel parameter(s) that can be used to determine an optimal relative phase difference signal for uplink diversity transmission. The base station can feed back the desired phase shift to the mobile station, or it can feed back information from which the mobile station can determine that phase shift.

FIG. 3 illustrates a non-limiting, example data frame structure that employs two known pilot signals. Each frame includes two time intervals for pilots P1 and P2, and a separate time slot for data in between the two pilots P1 and P2. Time gaps are preferably inserted between the pilots and data time intervals to prevent or minimize phase discontinuities when the phase shifter 38 switches to a different phase. It is desirable to assign known phase shifts to one or both of the pilots to be applied by the variable phase shifter 38 prior to transmission. For example, one of the pilots may be assigned a phase shift of 0°, and the other pilot a phase shift of 180°. The use of different phase shifts at the two pilots enables the receiver to estimate the channels from both transmit antennas effectively. If the same phase shift is used on both pilots, the receiver will not be able to distinguish the channels from the two antennas. While the pilot phase shift values can be fixed, they can also change as long as both the mobile station and the base station know the pilot phase shift values.

The phase shift applied to the data part of the frame varies depending on the uplink transmit diversity channel conditions. As explained above, the variable phase shift or associated information may be provided from the base station. During each time interval corresponding to the frame, the base station receives two pilot signals which represent two different linear combinations of the channels $C_1$ and $C_2$ from the two transmit antennas. Using these combinations, the base station calculates the channel transfer function from each transmit antenna from which the base station determines a phase shift to be used for transmission from the mobile station and feeds this phase shift value or associated information back to the mobile station, e.g., over a control channel.

The base station (or mobile station if the uplink and downlink channels are reasonably symmetric) can use different approaches to calculate the appropriate phase shift. In a first non-limiting example approach, the base station calculates the signal-to-noise ratio for the received signal from the mobile terminal for different phase shifts and selects the phase shift which maximizes the received signal-to-noise ratio under current uplink channel conditions. In a second non-limiting example approach, the base station calculates the correlation matrix of the channel response between the transmit and the receive antennas. This channel correlation matrix is averaged over frequency, and possibly over a limited amount of time. A maximal eigenvector (i.e., the eigenvector corresponding to the maximum eigenvalue) of this channel correlation matrix is found, and the base station selects the phase shift corresponding the phase of this eigenvector.

For this second approach, consider the following example with two transmit diversity uplink channels $C_1(f)$ and $C_2(f)$, where the dependence on frequency f is explicitly noted. The channel correlation matrix $K_{TX}$ of these channels has the form:

$$K_{TX} = \begin{bmatrix} 1 & \rho \\ \rho^* & 1 \end{bmatrix} \quad (1)$$

where $\rho$ is the average of $C_1(f) \, C^*_2(f)$ over frequency, normalized by the average amplitude of the two channels. It can be shown that the maximal eigenvalue $\lambda_{max}$ of this channel correlation matrix $K_{TX}$ is:

$$\lambda_{max} = 1 + |\rho| \quad (2)$$

and the eigenvector corresponding to this eigenvalue $\lambda_{max}$ has the form $\Psi_{max}$:

$$\Psi_{max} = \begin{bmatrix} 1 \\ |\rho|/\rho \end{bmatrix} \quad (3)$$

From equation (3), the antenna weight $W_1$ for the first transmit antenna is:

$$W_1 = 1$$

and the antenna weight $W_2$ for the second transmit antenna is:

$$W_2 = |\rho|/\rho = e^{-j\theta} \quad (4)$$

where $\theta$=angle ($\rho$) is a phase shift that should be used at the second transmit antenna for the data portion. The angle may be quantized to one of the possible values of the phase shift that the mobile station transmitter may actually use. In addition, if multiple receive antennas are used, $\rho$ may also be averaged over those receive antennas.

FIG. 4 is a flowchart illustrating example, non-limiting procedures for diversity transmission using the example data frame structure in FIG. 3. The phase shifts associated with the data frame pilots P1 and P2 are established (step S1). They may remain at those values, or they may be varied. Based on the current channel conditions, a desired phase shift (e.g., one that results in constructive combination of the diversity transmitted signals at the receiver) for the data portion of a frame to be transmitted is determined (step S2). The signal to be transmitted (including multiple frames) via two (or more) transmit diversity antennas is amplified in a power amplifier (step S3). The power amplifier output is routed towards to first and second transmit antennas $A_1$ and $A_2$ for transmission. The signal transmitted over each antenna $A_1$ and $A_2$ is associated with a corresponding radio channel transfer function $C_1$ and $C_2$ (step S4). Before providing the each data frame to the second antenna, the phase shifter adjusts the phase for the first pilot P1 for that frame by its determined phase shift (step S5). During a time gap between the first pilot and the data portion, the phase shifter adjusts the phase of the data portion for that frame by the desired phase shift, which might be provided by the receiver (e.g., a base station) as described earlier (step S6). During another time gap between the data portion and the second pilot P2, the phase shifter adjusts the phase of the second pilot P2 by its determined phase shift (step S7). The procedure may continue by returning to step S1.

Figure 5:
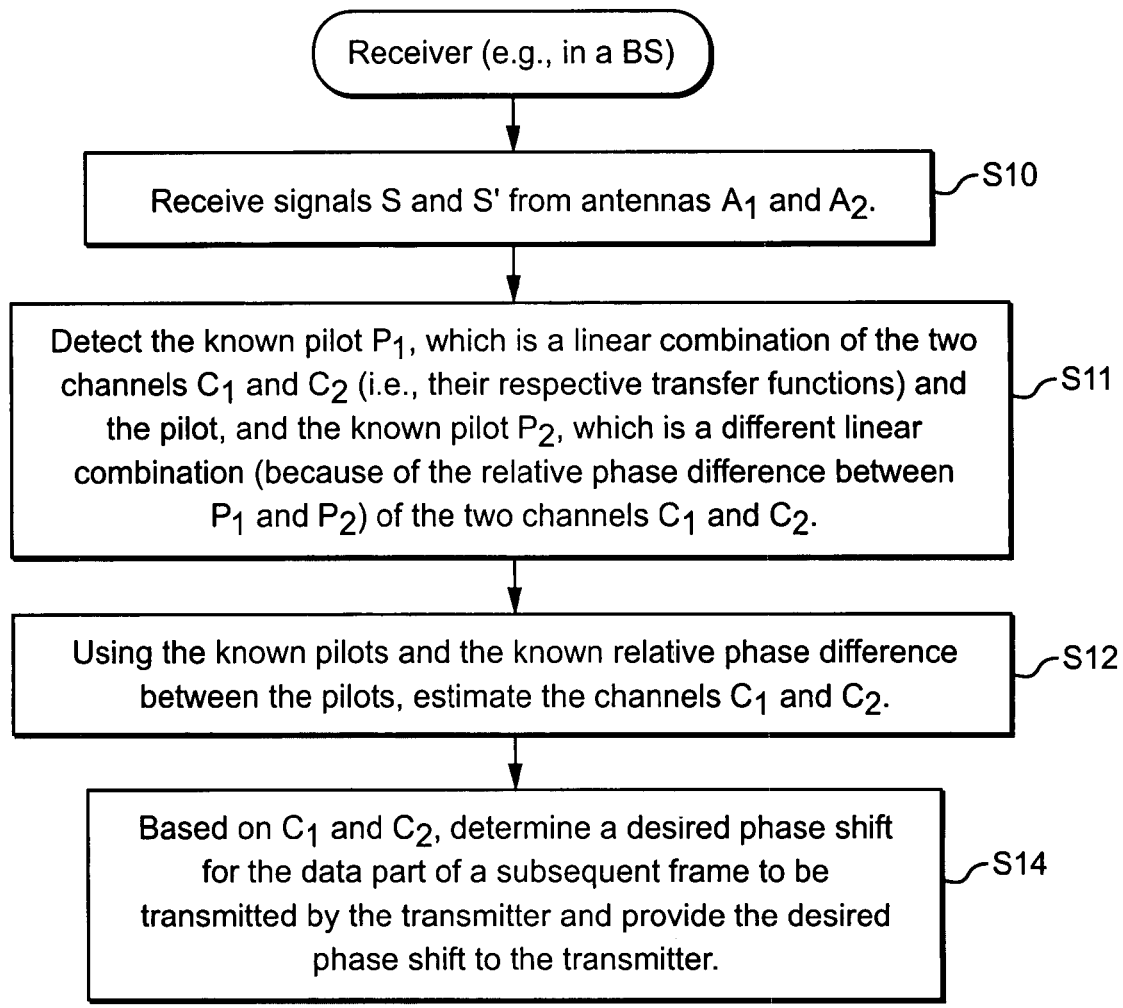
FIG. 5 is a flowchart illustrating example, non-limiting procedures in a receiver for providing desired phase shift information based on radio channel conditions to the diversity transmitter.

Assuming that a receiver phase feedback approach is desired, FIG. 5 is a flowchart illustrating example, non-limiting procedures in such a receiver for providing to the diversity transmitter desired phase shift information or a data portion of a frame based on radio channel conditions. The transmit signals S and S' (S' is a phase-shifted version of S) from antennas $A_1$ and $A_2$ are received at the receiver (step S10). The received pilot P1', which is a linear combination of the two channels $C_1$ and $C_2$ (i.e., their respective transfer functions) and the known pilot P1, and the received pilot P2', which is a different linear combination of the two channels $C_1$ and $C_2$ and the known pilot P2 (because of the relative phase shift difference between the two pilots), are detected (step S11). Using the known pilots and the known relative phase difference between the pilots, the channels $C_1$ and $C_2$ (e.g., their transfer functions) are estimated (step S12). In essence, these two linear combinations are two equations that can be solved for the two unknowns $C_1$ and $C_2$. Bases on the channel estimates, a desired phase shift for the data portion of a frame to be transmitted by the transmitter is determined and provided to the transmitter (step S13).

Figure 6:
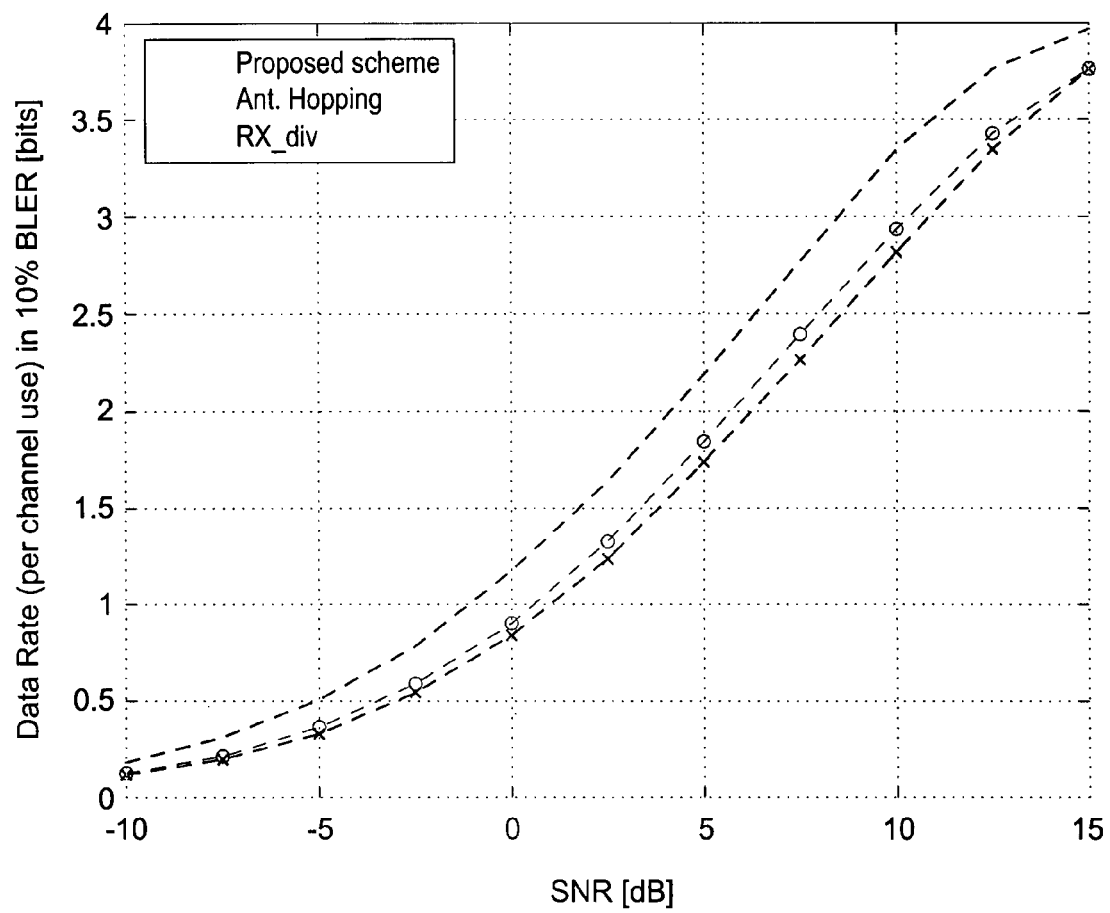
FIG. 6 is a graph illustrating data rate versus signal to noise ratio to show the performance of a single power amplifier diversity transmission scheme.

The performance of this phase-shift based transmit diversity scheme using just a single power amplifier was evaluated. Link-level simulations were performed for the transmit diversity channels $C_1$ and $C_2$ with a correlation coefficient between the two transmit antennas $A_1$ and $A_2$ equal to 0.5. FIG. 6 is a graph illustrating data rate versus signal-to-noise ratio (SNR) to show the performance of a single power amplifier diversity transmission scheme. The data rate (per channel use) at a 10% block error rate (BLER) is plotted as a function of average SNR for the proposed scheme shown as a dotted line, for a fixed schedule transmit antenna hopping scheme shown as a line with "o's", and for a receive diversity scheme (no transmission diversity) shown as a line with "x's". The proposed scheme outperforms the antenna hopping diversity scheme by 2 dB and the receive diversity only scheme by even more. For the entire range of SNR's, a higher data transmission rate is achieved as compared to these two other schemes.

In another non-limiting example embodiment, the RF power splitter 36 is also variably controlled by the controller 30 to allocate different power amounts to the two transmit diversity antenna branches. In this example, the base station feeds back amplitude and phase difference information between the two transmit antennas in order to obtain performance improvement. In one method, the receiver evaluates the resultant signal quality by applying multiple hypotheses of amplitude and phase differences between the two antennas to the estimated channel responses, chooses the best hypothesis, and communicates it to the transmitter. In cases where one channel is particularly stronger than the other, it may be useful to transmit with more power over the antenna corresponding to that channel rather than to transmit with equal power using both antennas. For a given total transmit power from the transmitter, this scheme has the potential to improve performance relative to a scheme where the transmit power is equal for both antennas.

Using the above described technology, diversity transmission can be provided with just a single power amplifier. As a result, the benefits afforded by diversity transmission may be attained without the drawbacks of increased expense, space, and power drain that come with multiple power amplifiers. These benefits are particularly significant for (but not limited to) mobile radio terminals. Moreover, by combining signals from two antennas rather than selecting one, significant performance gains are achieved.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. Apparatus for use in a radio transmitter, comprising:
a first antenna;
a second antenna;
a power amplifier having an input for receiving a transmit signal and an output signal provided to the first antenna and to the second antenna for diversity transmission of the output signal to a radio receiver;
a phase shifter for shifting a phase of the output signal by a first amount before transmission over the second antenna so that a relative phase shift exists between the output signal transmitted from the first antenna and the output signal transmitted from the second antenna;
a power splitter for splitting the output signal into a first magnitude provided to the first antenna and a second magnitude provided to the phase shifter,
electronic circuitry connected to control the phase shifter and configured to vary the first amount of phase shift applied by the phase shifter;
wherein the first and second magnitudes are variable and the electronic circuitry is configured to receive information from the radio receiver associated with the first amount of phase shift and information associated with an amount by which the electronic circuitry should vary the first and second magnitudes based on a magnitude difference between signals received from the first and second antennas.

2. The apparatus in claim 1, wherein the radio transmitter is included in a mobile radio terminal or a radio base station.

3. The apparatus in claim 1, wherein the processing circuitry is configured to determine the first amount of phase shift so that the signals transmitted from the first and second antennas constructively combine at the radio receiver.

4. The apparatus in claim 1, wherein the electronic circuitry is configured to calculate the first amount of phase shift based on one or more channel estimates of channels between the radio transmitter and the radio receiver.

5. Apparatus for use in a radio transmitter, comprising:
a first antenna;
a second antenna;
a power amplifier having an input for receiving a transmit signal and an output signal provided to the first antenna and to the second antenna for diversity transmission of the output signal to a radio receiver;
a phase shifter for shifting a phase of the output signal by a first amount before transmission over the second antenna so that a relative phase shift exists between the output signal transmitted from the first antenna and the output signal transmitted from the second antenna; and
electronic circuitry connected to control the phase shifter and configured to vary the first amount of phase shift applied by the phase shifter,
wherein the output signal is divided into multiple frames, each frame including a first pilot, a data portion, and a second pilot, and wherein a second amount of phase shift is associated with one of the first and second pilots and the first amount of phase shift is associated with the data portion.

6. The apparatus in claim 5, wherein there is a first time gap between the first pilot and the data portion and a second time gap between the data portion and the second pilot, and wherein the electronic circuitry is configured to control the phase shifter to change a phase of the output signal during the first time gap and during the second time gap.

7. Receiver apparatus for use with the apparatus in claim 5, comprising:
receiving circuitry configured to receive the diversity transmission of the output signal;
processing circuitry configured to:
detect the first and second pilots in the received diversity transmission;
determine a first channel estimate associated with the first antenna and a second channel estimate associated with the second antenna; and
determine the first phase shift amount based on the first and second channel estimates;
transmission circuitry configured to transmit the determined first phase shift amount to the radio transmitter apparatus.

8. The receiver apparatus in claim 7, wherein the processing circuitry is configured to determine the first phase shift amount based on the first and second channel estimates so that the signals transmitted from the first and second antennas constructively combine at the receiving circuitry.

9. The receiver apparatus in claim 7, wherein the processing circuitry is configured to calculate a signal-to-noie ratio of the received diversity transmission of the output signal for different first phase shifts and to select for transmission as the determined first phase shift amount one of the different first phase shifts having a higher or highest one of the calculated signal-to-noise ratios.

10. The receiver apparatus in claim 7, wherein the processing circuitry is configured to calculate a maximal eigenvector of a channel correlation matrix associated with the first and second channels averaged over time and frequency and to select for transmission as the determined first phase shift amount a phase shift corresponding to the phase of the maximal eigenvector.

11. A method for use in a radio transmitter that includes a first antenna, a second antenna, and a power amplifier, the method comprising:
receiving at an input of the power amplifier a signal to be transmitted;
providing an output signal from the power amplifier to the first antenna and to the second antenna;
diversity transmitting the output signal from the first and second antennas to a radio receiver;
shifting a phase of the output signal by a first phase shift amount before transmission over the second antenna so that a relative phase shift exists between the output signal transmitted from the first antenna and the output signal transmitted from the second antenna;
determining the first phase shift amount so that the signals transmitted from the first and second antennas constructively combine at the radio receiver;
splitting the output signal into a first magnitude provided to the first antenna and a second magnitude provided to the phase shifter, the first and second magnitudes are being variable; and
receiving from the radio receiver information associated with the first amount of phase shift and information associated with an amount by which to vary the first and second magnitudes based on a magnitude difference between signals received from the first and second antennas.

12. The method in claim 11, further comprising:
calculating the first amount of phase shift based on one or more channel estimates of channels between the radio transmitter and the radio receiver.

13. The method in claim 11, further comprising:
receiving information associated with the first amount of phase shift from the radio receiver, and
varying the first amount of phase shift based on the received information.

14. A method for use in a radio transmitter that includes a first antenna, a second antenna, and a power amplifier, the method comprising:
receiving at an input of the power amplifier a signal to be transmitted;
providing an output signal from the power amplifier to the first antenna and to the second antenna;
diversity transmitting the output signal from the first and second antennas to a radio receiver; and
shifting a phase of the output signal by a first phase shift amount before transmission over the second antenna so that a relative phase shift exists between the output signal transmitted from the first antenna and the output signal transmitted from the second antenna,
wherein the output signal is divided into multiple frames, each frame including a first pilot, a data portion, and a second pilot, and wherein a second amount of phase shift is associated with one of the first and second pilots and the first amount of phase shift is associated with the data portion.

15. The method in claim 14, wherein there is a first time gap between the first pilot and the data portion and a second time gap between the data portion and the second pilot, and wherein the method further comprises:
changing a phase of the output signal during the first time gap and during the second time gap.

16. A method in a radio receiver for use with the method in claim 14, comprising:

receiving the diversity transmission of the output signal;
detecting the first and second pilots in the received diversity transmission;
determining a first channel estimate associated with the first antenna and a second channel estimate associated with the second antenna;
determining the first phase shift amount based on the first and second channel estimates; and
transmitting the determined first phase shift amount to the radio transmitter.

17. The method in claim 16, further comprising:
calculating a signal-to-noise ratio of the received diversity transmission of the output signal for different first phase shifts and to select for transmission as the determined first phase shift amount one of the different first phase shifts having a higher or highest one of the calculated signal-to-noise ratios.

18. The method in claim 16, further comprising:
calculating a maximal eigenvector of a channel correlation matrix associated with the first and second channels averaged over time and frequency, and
selecting for transmission as the determined first phase shift amount a phase shift corresponding to the phase of the maximal eigenvector.

19. The method in claim 11, wherein the radio transmitter is included in a mobile radio terminal or a radio base station.

* * * * *